United States Patent [19]

Ward

[11] Patent Number: 4,913,615
[45] Date of Patent: Apr. 3, 1990

[54] HINGE AND RAMP ASSEMBLY

[76] Inventor: Harold Ward, 22905 Furton, St. Clair Shores, Mich. 48082

[21] Appl. No.: 229,250

[22] Filed: Aug. 8, 1988

[51] Int. Cl.⁴ .............................................. B60P 1/00
[52] U.S. Cl. ..................................... 414/537; 16/389; 14/69.5; 224/42.03 R
[58] Field of Search ............... 414/537, 538, 571, 430, 414/469, 470, 480; 105/436; 296/51, 61; 14/69.5, 71.1; 16/389, 387; 224/42.03 R, 42.32, 42.43, 42.44, 42.45 R, 42.46 R, 329

[56] References Cited

U.S. PATENT DOCUMENTS

| | | | |
|---|---|---|---|
| 189,866 | 4/1877 | Long | 16/389 |
| 344,149 | 6/1886 | Wheeler | 16/389 |
| 1,357,607 | 11/1920 | Behrens et al. | |
| 1,429,527 | 9/1922 | Paul | 16/389 |
| 2,183,413 | 12/1939 | Slick | 16/389 |
| 2,573,714 | 11/1951 | Karl | 296/61 X |
| 2,727,781 | 12/1955 | D'Eath | 296/61 |
| 2,900,094 | 8/1959 | Ferguson | |
| 3,255,902 | 6/1966 | Welten | |
| 3,352,440 | 11/1967 | Wilson | 296/61 |
| 3,642,156 | 2/1972 | Stenson | |
| 3,913,934 | 10/1975 | Koehn et al. | 414/537 X |
| 3,976,209 | 8/1976 | Burton | 296/61 X |
| 4,043,468 | 8/1977 | Shea | |
| 4,084,713 | 4/1978 | Rohrs et al. | 414/537 |
| 4,141,109 | 2/1979 | Farrell | 16/387 X |
| 4,624,619 | 11/1986 | Uher | |

Primary Examiner—Robert J. Spar
Assistant Examiner—Robert S. Katz
Attorney, Agent, or Firm—Basile and Hanlon

[57] ABSTRACT

A hinge and ramp assembly including first and second plate-like members, each having bottom portions and flanged end portions at one end, with a pivotal device disposed therebetween. The plate-like members may be pivoted from a first closed position in which the bottom portions are in face-to-face engagement to a second load bearing position in which the flanged end portions are in face-to-face engagement and are configured to carry loads placed on the assembly which would act to open the assembly further. Ramp members, configured to matingly engage with the inside surface of each plate-like member formed by said bottom and flanged end portion, are attached to the hinge assembly to provide a ramp apparatus which is rigid and may be used to bridge a distance.

5 Claims, 1 Drawing Sheet

HINGE AND RAMP ASSEMBLY

BACKGROUND OF THE INVENTION

1. Field of the Invention

The present invention is concerned with a hinge and ramp assembly, useful for supporting heavy objects thereon in which the hinge acts to support a substantial portion of the load placed on the assembly.

2. Description of the Relevant Art

The art relevant to the above field of invention, including hinge and ramp designs, have heretofore failed to address a concern of operators of vehicles, such as pick-up trucks, having tailgates over which heavy loads must pass during the loading process. The concern is generally of damage to the tailgate due to excessive loading, by heavy articles passing over the tailgate and onto the bed of the vehicle. Several loading ramp designs actively utilize the tailgate as a load bearing member in the ramp design, while others dispense with the tailgate completely and attach the ramp member to the end of the bed. None of the designs known to the applicant are simple to use or store, with most requiring modification of the vehicle.

Additionally, prior designs fail to provide a hinge that is designed in such a manner that the hinge assembly itself supports a substantial part of the load which is placed upon the ramps, thus lowering the destructive forces which may be placed upon the ends of the ramps.

The present invention is directed to a hinge and ramp assembly which addresses the above shortcomings.

SUMMARY OF THE INVENTION

In accordance with the present invention, a hinge and ramp assembly for use in supporting heavy objects comprises first and second plate-like members, each having a bottom and a flanged end portion which extends outwardly from one end of each of the members. Pivotal means are attached to the outer edges formed by the intersection of the bottom and flanged end portions. The pivot means are configured for matng engagement thereby allowing the plate-like members to be engaged with one another for pivotal movement about an axis parallel to the edge portion formed by the intersection of the bottom and the flanged end portions. The plates may be pivoted from a first, closed position in which the bottom portions of each member are in face-to-face relationship, to a second, load bearing position in which the flanged end portions are seated in face-to-face engagement, thereby acting as a stop against further opening of the plate-like members and allowing a transfer of load placed on the hinge to the flanged end portions.

A second part of the present invention is the application of the hinge, described above, to a ramp assembly in which ramp members are fixedly attached to each of the plate-like members. Each ramp member has a hinge engaging end which is configured to matingly engage the plate member along the inner surface formed between the bottom and flanged end portions. The ramp members are of a predetermined length which depends upon the particular application of the assembly. Typically, a first, shorter member will be utilized as an upper horizontal member which engages the bed of the vehicle being loaded, and is long enough to span the tailgate without contact. The second member would typically be of a longer length and would extend in a non-horizontal direction from the height of the bed being loaded to the ground or to a loading ramp.

Upon opening of the ramp assembly to its load bearing position, the ramp assembly will form a rigid load bearing surface which can be utilized to support a heavy load while bridging a distance, such as the length of a tailgate. Additionally, due to the configuration of the hinged assembly, the flanged end portions will carry a substantial portion of the load applied to the ramp assembly thereby protecting the ramp members from destructive forces being placed upon the ends.

Other objects and features of the invention will become apparent by reference to the following specification and to the drawings.

DESCRIPTION OF THE PREFERRED EMBODIMENTS

Figure 1:
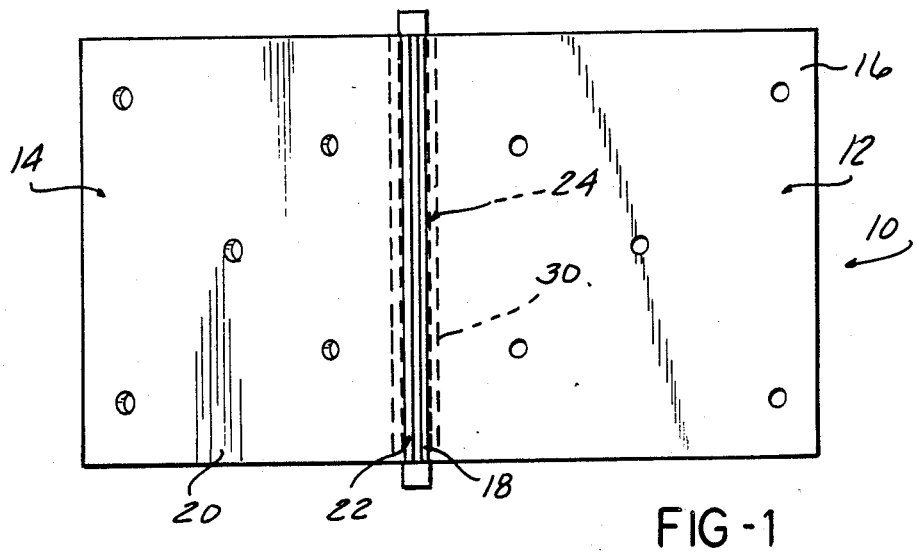
FIG. 1 is a top view of the hinge assembly of the present invention.
Figure 2:
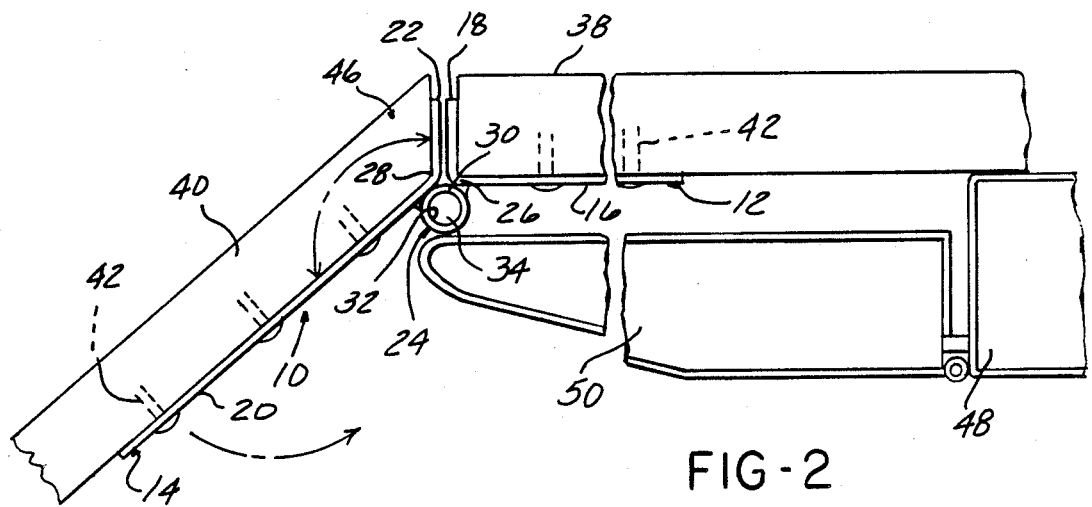
FIG. 2 is a side view of the hinge and ramp assembly in its load bearing position spanning the tailgate of a vehicle to be loaded.
Figure 3:
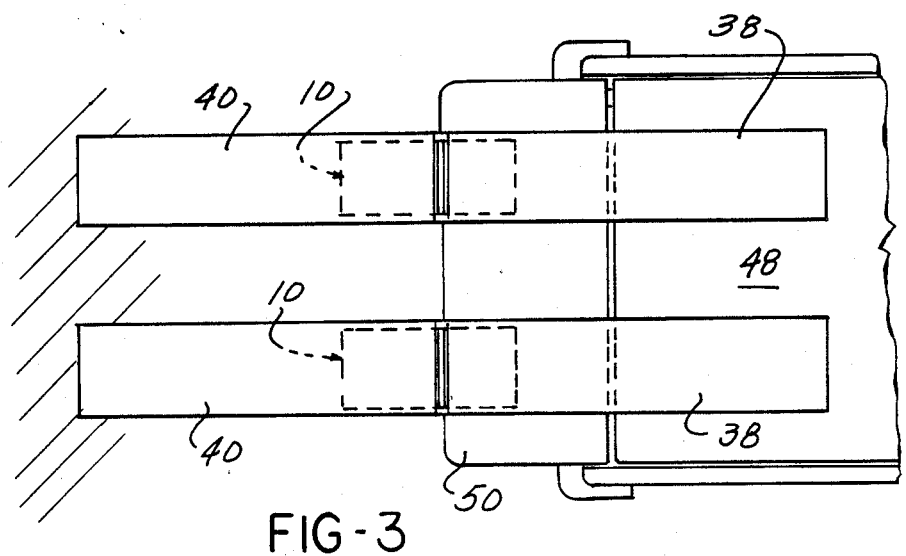
FIG. 3 is a top view of the hinge and ramp assembly of the present invention placed in a load bearing position on a vehicle bed.

There is shown in FIGS. 1 through 3 a typical embodiment of the hinge assembly of the present invention. The hinge assembly, designated generally as 10, comprises first and second plate-like members 12 and 14, respectively. First plate member 12 has a bottom portion 16 and a flanged end portion 18 which extends outwardly from one end of bottom portion 16, as shown in FIG. 2. In the present embodiment, the intersection of flanged end portion 18 with bottom portion 16 forms a 90 degree inside angle. However, the actual configuration of hinge assembly 10 would not be limited to 90 degrees, but would be dependent upon the specific application to which the hinge assembly 10 was applied. Second plate-like member 14 also has a bottom portion 20 and a flanged end portion 22 extending outwardly from one end of the bottom portion. In the particular embodiment disclosed in FIG. 2, the inside angle formed between flanged end portion 22 and bottom portion 20 of second plate-like member 14 forms an obtuse angle. As noted above, the angle formed between the bottom and flanged end portions 20 and 22 will vary with the application of the hinge member.

Pivot means 24 are carried by the first and second plate-like members 12 and 14 along the outer edges 26 and 28 formed by the intersection of bottom portions 16 and 20 with flanged end portions 18 and 22, respectively. The pivot means comprise gudgeons 30 which are fixedly attached, as by welding to each of first and second plate-like members 12 and 14 along outer edges 26 and 28, respectively. The gudgeons are placed so as to be interposed to form an aligned aperture 32 when the first and second plate-like members 12 and 14 are placed in adjacent, end to end, pivotal relationship. Disposed within aligned aperture 32, formed by the interposed gudgeons 30, is hinge pin 34. Hinge pin 34 acts to retain the first and second plate-like members 12 and 14 into pivotal engagement. Retaining means, such as cotter pins (not shown), may be used to retain hinge pin 34 within aligned aperture 32.

In operation, the hinge assembly is pivotable from a first closed position, in which the bottom portions 16 and 20 of each plate-like member 12 and 14, respectively, are in face-to-face engagement to a second, opened, load-bearing position in which the flanged end portions 18 and 22 are seated in face-to-face engagement as shown in FIGS. 1 and 2. When in the second, load bearing position, the flanged end portions 18 and 22 act to prevent further opening of the hinge assembly by carrying loads placed on the hinge assembly which would tend to move the hinge further open.

The hinge assembly 10, described above, may be utilized in a number of various application, one of which is the ramp assembly shown in FIGS. 2 and 3, and described in further detail below. First and second ramp members 38 and 40, respectively, are fixedly attached to first and second plate-like members 12 and 14 along the inner surfaces of the plate-like members; said surfaces formed between the bottom portions 16 and 20 and the flanged end portions 18 and 22. The ramp members may be constructed of any suitable material, such as wood. The ramp material used will depend in large part on the application of the ramp assembly. Fixing means, such as wood screws 42, may be used to retain the ramp members in engagement with the first and second plate-like members 12 and 14. The ramp members 38 and 40 have plate engaging ends 44 and 46 which are configured to matingly engage the plate-like members 12 and 14 as shown in FIG. 2.

In operation, the ramp members are pivotable from a first, closed position in which the ramp members 38 and 40 are in face-to-face engagement. This position allows the ramp members to be stored in a relatively flat position and is very useful when space is at a premium. The ramp members may be pivoted to a second, load bearing position as shown in FIGS. 2 and 3, in which the flanged end portions of the first and second plate-like members 12 and 14 are seated in face-to-face engagement. The second load bearing position prevents further opening of the ramp assembly and acts to transfer loads which are placed on the ramp assembly, to the flanged end portions of the plate-like members. The transfer of load to the plate-like members prevents destructive loading forces from being placed on the ends of the ramp members.

Additionally, the action of the flanged end portions 18 and 22, to prevent further opening of the ramp assembly, provides a rigid, bridge-like structure which may be utilized to span a distance during loading. Such a rigid structure allows the ramp member to be placed on, for example, the bed 48 of a vehicle to be loaded, while, at the same time, spanning the tailgate 50 thereby avoiding the transfer of loads to the tailgate and resultant damage.

While one embodiment of the invention has been described in detail above in relation to a hinge and ramp assembly, it would be apparent to those skilled in the art that the disclosed embodiment may be modified. Therefore, the foregoing description is to be considered exemplary rather than limiting, and the true scope of the invention is that defined in the following claims.

What is claimed is:

1. A loading ramp apparatus removably usable with trucks having a tailgate and a bed, the loading ramp comprising:

first and second plate-like members each having first and second ends, a bottom portion and a flanged end portion extending upwardly from a first end of said plate-like members;

a first and second ramp member, each of predetermined length, each having first plate-engaging ends configured to matingly engage inner surfaces of said first and second plate-like members formed between said bottom portion and said flanged end portion;

pivot means, carried by said first and second plate-like members at the outer edges formed by the intersection of said bottom portions and said flanged end portions for pivotally connecting said plate-like members for pivotal movement from a first closed position in which said ramp members are in face-to-face engagement, to a second load-bearing position in which said flanged end portions of said first and second plate-like members are seated in face-to-face engagement and said bottom portions of said first and second plate-like members being disposed at an obtuse angle with respect to each other, thereby preventing further opening of said first and second ramp members about said hinge means and transmitting loading forces placed on said ramp assembly from said second ramp member to said flanged end portions to prevent loading forces from being absorbed by said first plate-engaging ends of said ramp members;

said first ramp member having a second bed contacting end, said first ramp member adapted to be placed in removable overlying contact with the bed of the truck such that said second end extends into the bed interior, said first ramp member having sufficient length to span the tailgate when said pivot means is in the second laod-bearing position and said first ramp member is removably positioned in the bed;

said second ramp member having a second ground-contacting end, said second member having a length sufficient to span the distance between said pivot means and the ground when the apparatus is in said second load-bearing position and to define a space between the tailgate and the first ramp member when said first ramp member is in overlying removvble contact with the bed of the truck.

2. The ramp apparatus defined in claim 1, further comprising:

gudgeons, fixedly attached to said first and second plate-like members;

a hinge pin, slidably received within said gudgeons to retain said first and second plate-like members in pivotal engagement;

retaining means, disposed at the ends of said hinge pin for retaining said pin within the gudgeons.

3. The ramp apparatus defined in claim 1, wherein:

the inside angle, formed between said bottom portion and said flanged end portion of one of said plate-like members is an obtuse angle.

4. The ramp apparatus defined in claim 1, wherein:

the inside angle formed between said bottom portion and said flanged end portion of said first plate-like member is 90 degrees.

5. A loading ramp apparatus removably useable with trucks having a tailgate and a bed, the loading ramp comprising:

first and second plate-like members, each having first and second ends, a bottom portion, and a flanged end portion extending upwardly form a first end of said plate-like members; wherein the angle formed between said bottom portion and said flanged end portion of one of said plate-like members is an obtuse angle;

a first and a second ramp member, each of predetermined length, each having first plate-engaging ends configured to matingly engage inner surfaces of said first and second plate-like members formed between said bottom portion and said flanged end portion;

pivot means, carried by said first and second plate-like members at the outer edges formed by the intersection of said bottom portions and said flanged end portions for pivotally connecting said plate-like members for pivotal movement from a first closed position in which said ramp members are in face-to-face engagement, to a second load-bearing position in which said flanged end portions of said first and second plate-like members are seated in face-to-face engagement and said bottom portions of said first and second plate-like members being disposed at an obtuse angle with respect to each other, thereby preventing further opening of said first and second ramp members about said hinge means and transmitting loading forces placed on said ramp assembly from said second ramp member to said flanged end portions to prevent loading from being absorbed by said first plate-engaging ends of said ramp members;

gudgeons, fixedly attached to said first and second plate-like members;

a hinge pin slidably received within said gudgeons to retain said first and second plate-like members in pivotal engagement;

retaining means, disposed at the ends of said hinge pin, for retaining said pin within the gudgeons;

said first ramp members having a second bed contacting end, said first ramp member adapted to be placed in removable overlying contact with the bed of the truck such that said second end extends into the bed interior, said first ramp member having sufficient length to span the tailgate when said pivot means is in said second load-bearing position and said first ramp member is removably positioned in the bed;

said second ramp member having a second ground-contacting end, said second member having a length sufficient to span a distance between said pivot means and the ground when the apparatus is in said second load-bearing position and to define a space between the tailgate and the first ramp member when said first ramp member is in overlying contact with the bed of the truck.

* * * * *